United States Patent
Balakrishnan et al.

(10) Patent No.: US 7,209,612 B2
(45) Date of Patent: Apr. 24, 2007

(54) TWO-STAGE OPTICAL BI-DIRECTIONAL TRANSCEIVER

(75) Inventors: Ashok Balakrishnan, Ottawa (CA); Serge Bidnyk, Ottawa (CA); Matt Pearson, Ashton (CA)

(73) Assignee: Enablence Inc., Kanata, Ontario (CA)

( * ) Notice: Subject to any disclaimer, the term of this patent is extended or adjusted under 35 U.S.C. 154(b) by 168 days.

(21) Appl. No.: 11/140,942

(22) Filed: Jun. 1, 2005

(65) Prior Publication Data

US 2005/0213887 A1 Sep. 29, 2005

Related U.S. Application Data

(63) Continuation-in-part of application No. 10/971,129, filed on Oct. 25, 2004, now Pat. No. 7,151,635, which is a continuation-in-part of application No. 10/923,987, filed on Aug. 24, 2004, now Pat. No. 7,068,885.

(60) Provisional application No. 60/577,604, filed on Jun. 8, 2004, provisional application No. 60/557,711, filed on Mar. 31, 2004, provisional application No. 60/555,686, filed on Mar. 24, 2004, provisional application No. 60/555,697, filed on Mar. 24, 2004.

(51) Int. Cl.
*G02B 6/34* (2006.01)
*G02B 6/12* (2006.01)
*H04J 14/02* (2006.01)

(52) U.S. Cl. .................. 385/37; 385/129; 385/130; 385/14; 398/84; 398/87; 398/85; 398/135; 398/139

(58) Field of Classification Search .............. 385/14, 385/37, 24, 46, 31, 39, 47, 50, 129, 130, 385/131, 132; 398/84, 85, 82, 79, 87, 135, 398/139
See application file for complete search history.

(56) References Cited

U.S. PATENT DOCUMENTS

| | | | |
|---|---|---|---|
| 6,298,186 B1 * | 10/2001 | He | 385/37 |
| 6,493,121 B1 | 12/2002 | Althaus | 359/152 |
| 6,575,460 B2 | 6/2003 | Vollman et al. | 221/270 |
| 6,694,102 B2 | 2/2004 | Baumann et al. | 398/138 |
| 6,731,882 B1 | 5/2004 | Althaus et al. | 398/139 |
| 6,904,203 B2 * | 6/2005 | Logvin et al. | 385/37 |
| 7,068,885 B2 * | 6/2006 | Bidnyk et al. | 385/37 |
| 7,151,635 B2 * | 12/2006 | Bidnyk et al. | 359/572 |
| 2003/0048498 A1 | 3/2003 | Pearson et al. | 359/110 |
| 2003/0091282 A1 | 5/2003 | Packirisamy et al. | 385/37 |
| 2003/0128916 A1 | 7/2003 | Sasaki | 385/24 |
| 2004/0008987 A1 | 1/2004 | Pearson et al. | 398/43 |
| 2004/0234201 A1 * | 11/2004 | Logvin et al. | 385/37 |
| 2004/0240063 A1 | 12/2004 | Delage et al. | 359/571 |
| 2005/0213887 A1 * | 9/2005 | Balakrishnan et al. | 385/46 |

* cited by examiner

OTHER PUBLICATIONS

"A three-focal-point method for the optimal design of a flat-top planar waveguide demultiplexer" Zhimin et al., IEEE Journal of Selected Topics in Quantum Electronics, vol. 8, Issue 6, Nov.-Dec. 2002, pp. 1179-1185.

*Primary Examiner*—Brian M. Healy
(74) *Attorney, Agent, or Firm*—Teitelbaum & MacLean; Neil Teitelbaum; Doug MacLean (57) ABSTRACT

The invention relates to a planar lightwave circuit including a two stage optical filter for use in a bi-directional transceiver. A first stage includes a non-dispersive optical filter, which enables light within in a certain wavelength range, e.g. a signal channel from a laser source, to be launched onto an input/output waveguide, while light within another wavelength range, e.g. one or more detector channels, will be directed from the input/output waveguide to a second stage. The second stage includes a reflective diffraction grating with a higher resolution than the first stage providing passbands 2 to 5 times thinner than the first stage.

19 Claims, 7 Drawing Sheets

TWO-STAGE OPTICAL BI-DIRECTIONAL TRANSCEIVER

CROSS-REFERENCE TO RELATED APPLICATIONS

The present application is a continuation in part of U.S. patent applications No. Ser. 10/923,987 filed Aug. 24, 2004, now U.S. Pat. No. 7,068,885, which claims priority from U.S. Pat. Nos. 60/555,686 filed Mar. 24, 2004 and 60/557,711 filed Mar. 31, 2004, and the present application is a continuation in part of U.S. patent application Ser. No. 10/971,129 filed Oct. 25, 2004, now U.S. Pat. No. 7,151,635, which claims priority from U.S. patent application Ser. No. 60/555,697 filed Mar. 24, 2004, and the present application also claims priority from U.S. patent applications Ser. No. 60/577,604 filed Jun. 8, 2004 and from International Patent Application No. PCT/CA2005/000350 filed Mar. 7, 2005, which are all incorporated herein by reference.

TECHNICAL FIELD

The present invention relates to a two stage optical filter, and in particular to a planar lightwave circuit (PLC) optical bi-directional transceiver for use in fiber-to-the-home (FTTH) optical networks.

BACKGROUND OF THE INVENTION

A bi-directional transceiver, e.g. a triplexer or Voice-Data-Video (VDV) processor, serves as an optical gateway from an FTTH optical network into a subscriber's home. A triplexer is an extremely compact and low-cost access device capable of receiving two high-speed channels (e.g. 1490 nm for telephone & internet, and 1550 nm for video), while simultaneously transmitting on a third channel (e.g. 1310 for information out). All these signals are multiplexed onto a single optical fiber for simple installation. For business purposes the video channel can be omitted forming a two channel bi-directional transceiver or biplexer. Alternatively, additional outgoing information channels can be added, as well as additional incoming data channels.

Typical biplexer and triplexer requirements present considerable challenges to conventional PLC design techniques. The optical architecture requires that a laser, nominally 1310 nm in wavelength, is coupled to a single-mode fiber for transmitting optical signals from the home. In the other direction on that same fiber, light at wavelengths of nominally 1490 nm and 1550 nm from outside the home are captured, demultiplexed and directed to optical detectors. The difficulty arises due to the operational passbands at these wavelengths. At the 1310 nm channel, a band of 50 nm to 100 nm is expected, which provides a large margin within which the laser can operate essentially athermally, whereas bands of only 10 nm to 20 nm width are required for the detector channels. Furthermore, the laser diode operates in a single transverse mode, and the common input/output fiber is a single mode fiber; hence, the path followed by the laser channel must be at all points compatible with single-mode optics. In other words the laser channel's path must be reversible. In the prior art, especially those designs using a single diffractive structure in a PLC, there is no practical means of addressing a wide wavelength range (~1250 nm to 1600 nm) with channels having substantially different passbands.

Prior art devices, such as the one disclosed in U.S. Pat. No. 6,493,121 issued Dec. 10, 2002 to Althaus, and illustrated in FIG. 1, achieve the functionality of the VDV processor (triplexer 1) using a number of individually crafted thin film filters (TFF) 2a and 2b, placed in specific locations along a collimated beam path. The TFFs 2a and 2b are coupled with discrete lasers 3 and photo-detectors 4a and 4b, and packaged in separate transistor-outline (TO) cans 6 and then individually assembled into one component. An incoming signal with the two incoming channels (1490 nm and 1550 nm) enter the triplexer 1 via an optical fiber 7. The first channel is demultiplexed by the first TFF 2a and directed to the first photo-detector 4a, and the second channel is demultiplexed by the second TFF 2b and directed to the second photo-detector 4b. The outgoing channel (1310 nm) is generated in the laser 3 and output the optical fiber 7 via the first and second TFFs 2a and 2b. Unfortunately, the assembly of such a device is extremely labor intensive requiring all of the elements to be aligned with very low tolerances.

Figure 2:
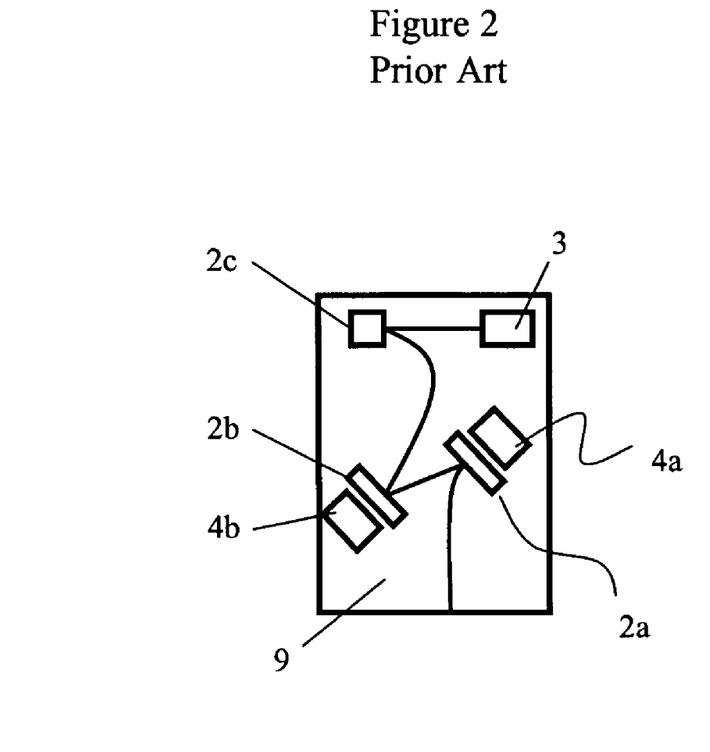
FIG. 2 illustrates a conventional thin film filter based triplexer utilizing a semiconductor substrate.

Attempts to simplify the housing structure and thereby the assembly process are disclosed in U.S. Pat. No. 6,731,882 issued May 4, 2004 to Althaus et al, and U.S. Pat. No. 6,575,460 issued Jan. 29, 2004 to Melchoir et al. Further advancements, illustrated in FIG. 2, involve mounting all of the elements on a semiconductor microbench ensuring repeatable and precise alignment. Unfortunately, all of these solutions still involve the alignment of TFFs with TO cans. An example of a prior art solution without TFFs is disclosed in U.S. Pat. No. 6,694,102 issued Feb. 17, 2004 to Baumann et al., which discloses a bi-directional multiplexer utilizing a plurality of Mach-Zehnder interferometers.

In optics, a diffraction grating is an array of fine, parallel, equally spaced grooves ("rulings") on a reflecting or transparent substrate, which grooves result in diffractive and mutual interference effects that concentrate reflected or transmitted electromagnetic energy in discrete directions, called "orders," or "spectral orders."

The groove dimensions and spacings are on the order of the wavelength in question. In the optical regime, in which the use of diffraction gratings is most common, there are many hundreds, or thousands, of grooves per millimeter.

Order zero corresponds to direct transmission or specular reflection. Higher orders result in deviation of the incident beam from the direction predicted by geometric (ray) optics. With a normal angle of incidence, the angle θ, the deviation of the diffracted ray from the direction predicted by geometric optics, is given by the following equation, where m is the spectral order, λ is the wavelength, and d is the spacing between corresponding parts of adjacent grooves:

$$\theta = \pm \sin^{-1}\left(\frac{m\lambda}{d}\right)$$

Because the angle of deviation of the diffracted beam is wavelength-dependent, a diffraction grating is dispersive, i.e. it separates the incident beam spatially into its constituent wavelength components, producing a spectrum.

The spectral orders produced by diffraction gratings may overlap, depending on the spectral content of the incident beam and the number of grooves per unit distance on the grating. The higher the spectral order, the greater the overlap into the next-lower order. Diffraction gratings are often used in monochromators and other optical instruments.

By controlling the cross-sectional shape of the grooves, it is possible to concentrate most of the diffracted energy in the order of interest. This technique is called "blazing."

Originally high resolution diffraction gratings were ruled. The construction of high quality ruling engines was a large undertaking. A later photolithographic technique allows gratings to be created from a holographic interference pattern. Holographic gratings have sinusoidal grooves and so are not as bright, but are preferred in monochromators because they lead to a much lower stray light level than blazed gratings. A copying technique allows high quality replicas to be made from master gratings, this helps to lower costs of gratings.

Figure 3:
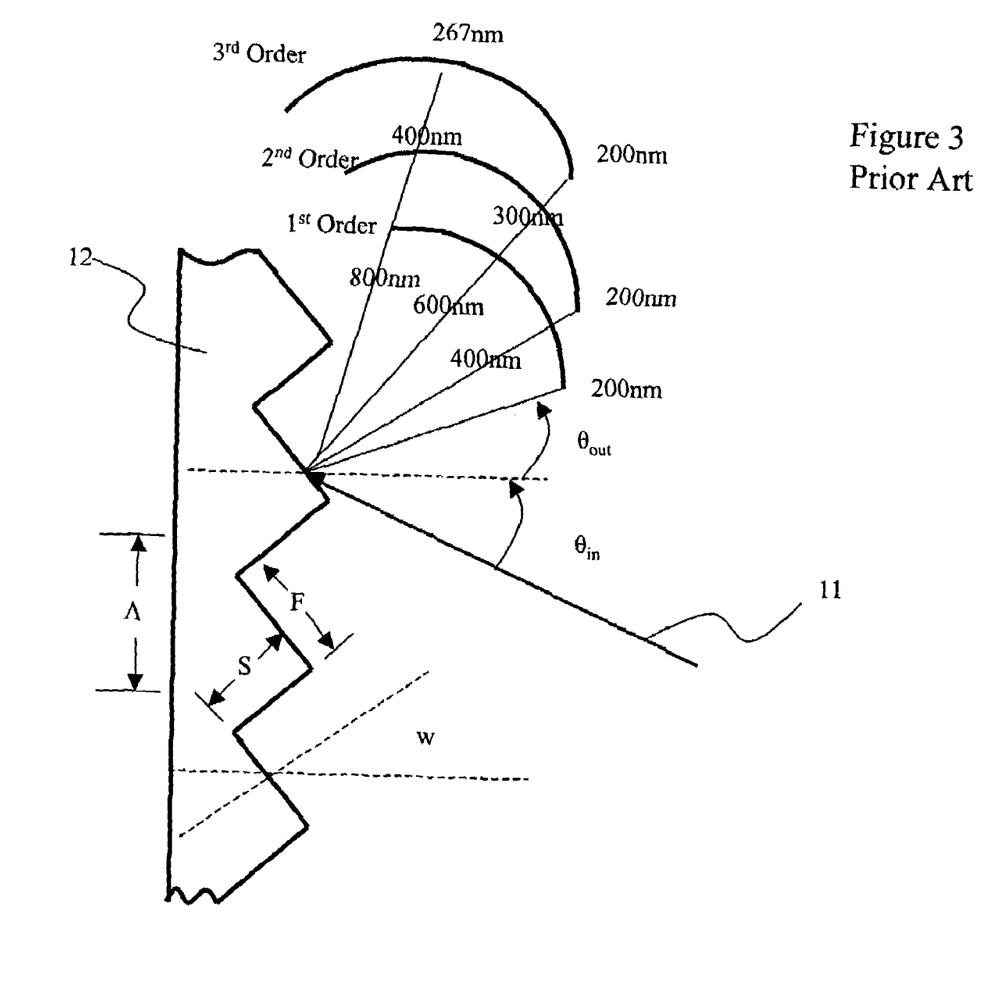
FIG. 3 illustrates a conventional reflective diffraction grating.

A planar waveguide reflective diffraction grating includes an array of facets arranged in a regular sequence. The performance of a simple diffraction grating is illustrated with reference to FIG. 3. An optical beam 11, with a plurality of wavelength channels $\lambda_1, \lambda_2, \lambda_3 \ldots$, enters a diffraction grating 12, with grading pitch $\Lambda$ and diffraction order m, at a particular angle of incidence $\theta_{in}$. The optical beam is then angularly dispersed at an angle $\theta_{out}$ depending upon wavelength and the order, in accordance with the grating equation:

$$m\lambda = \Lambda(\sin\theta_{in} + \sin\theta_{out}) \quad (1)$$

From the grating equation (1), the condition for the formation of a diffracted order depends on the wavelength $\lambda_N$ of the incident light. When considering the formation of a spectrum, it is necessary to know how the angle of diffraction $\theta_{Nout}$ varies with the incident wavelength $\theta_{in}$. Accordingly, by differentiating the equation (1) with respect to $\theta_{Nout}$, assuming that the angle of incidence $\theta_{in}$ is fixed, the following equation is derived:

$$\partial\theta_{Nout}/\partial\lambda = m/\Lambda \cos\theta_{Nout} \quad (2)$$

The quantity $d\theta_{Nout}/d\lambda$ is the change of the diffraction angle $\theta_{Nout}$ corresponding to a small change of wavelength $\lambda$, which is known as the angular dispersion of the diffraction grating. The angular dispersion increases as the order m increases, as the grading pitch $\Lambda$ decreases, and as the diffraction angle $\theta_{Nout}$ increases. The linear dispersion of a diffraction grating is the product of this term and the effective focal length of the system.

Since light of different wavelengths $\lambda_N$ are diffracted at different angles $\theta_{Nout}$, each order m is drawn out into a spectrum. The number of orders that can be produced by a given diffraction grating is limited by the grating pitch $\Lambda$, because $\theta_{Nout}$ cannot exceed 90°. The highest order is given by $\Lambda/\square_\square$. Consequently, a coarse grating (with large $\Lambda$) produces many orders while a fine grating may produce only one or two.

The free spectral range (FSR) of a diffraction grating is defined as the largest bandwidth in a given order which does not overlap the same bandwidth in an adjacent order. The order m is important in determining the free spectral range over which continuous dispersion is obtained. For a given input-grating-output configuration, with the grating operation at a preferred diffraction order m for a preferred wavelength $\lambda$, other wavelengths will follow the same path at other diffraction orders. The first overlap of orders occurs when $$m\lambda_m = (m+1)\lambda_{m+1} \quad (3)$$

$$\lambda_{m+1} = \frac{m\lambda_m}{(m+1)} \quad (4)$$

$$\Delta\lambda = \frac{\lambda_m}{m+1} \quad (5)$$

A blazed grating is one in which the grooves of the diffraction grating are controlled to form right triangles with a blaze angle w, as shown in FIG. 3. The selection of the blaze angle w offers an opportunity to optimize the overall efficiency profile of the diffraction grating, particularly for a given wavelength.

Planar waveguide diffraction based devices provide excellent performance in the near-IR (1550 nm) region for Dense Wavelength Division Multiplexing (DWDM). In particular, advancements in Echelle gratings, which usually operate at high diffraction orders (40 to 80), high angles of incidence (approx 60°) and large grading pitches, have lead to large phase differences between interfering paths. Because the size of grating facets scales with the diffraction order, it has long been considered that such large phase differences are a necessity for the reliable manufacturing of diffraction-based planar waveguide devices. Thus, existing devices are limited to operation over small wavelength ranges due to the high diffraction orders required (see equation 5).

Furthermore, for diffraction grating-based devices fabricated in a planar waveguide platform, a common problem encountered in the prior art is polarization dependent loss arising from field exclusion of one polarization caused by the presence of conducting metal S (a reflective coating) adjacent to the reflective facets F.

An optical signal propagating through an optical fiber has an indeterminate polarization state requiring that the (de) multiplexer be substantially polarization insensitive so as to minimize polarization dependent losses. In a reflection grating used near Littrow condition, and blazed near Littrow condition, light of both polarizations reflects equally well from the reflecting facets (F in FIG. 3). However, the metalized sidewall facet S introduces a boundary condition preventing light with polarization parallel to the surface (TM) from existing near the surface. Moreover, light of one polarization will be preferentially absorbed by the metal on the sidewall S, as compared to light of the other polarization. Ultimately, the presence of sidewall metal manifests itself in the device performance as polarization-dependent loss (PDL).

There are numerous methods and apparatus for reducing the polarization sensitivity of diffraction gratings. Chowdhury, in U.S. Pat. Nos. 5,966,483 and 6,097,863 describes a reduction of polarization sensitivity by choosing to reduce the difference between first and second diffraction efficiencies of a wavelength within the transmission bandwidth. This solution can be of limited utility because it requires limitations on election of blaze angles and blaze wavelength.

Sappey et al, in U.S. Pat. No. 6,400,509, teaches that polarization sensitivity can be reduced by including reflective step surfaces and transverse riser surfaces, separated by a flat. This solution is also of limited utility because it requires reflective coating on some of the surfaces but not the others, leading to additional manufacturing steps requiring selective treatment of the reflecting interfaces.

The free spectral range of gratings is proportional to the size of the grating facets. It has long been thought that gratings with a small diffraction order could not be formed reliably by means of photolithographic etching, because low order often implies steps smaller or comparable to the photolithographic resolution. The photolithographic resolution and subsequent processing steps blur and substantially degrade the grating performance. Therefore, the field of etched gratings has for practical reasons limited itself to reasonably large diffraction orders typically in excess of order 10. Devices with orders ranging close to order 1 have long been thought to be impractical to realize.

Other important considerations in the design of a triplexer is the optical isolation of the 1310 nm channel from the 1490 nm and 1550 nm channels, and the insertion loss of each channel, which must be kept at a minimum. This is particularly true for the 1310 nm laser channel, since the coupling of the laser diode to the waveguide chip is a difficult process and requires a relaxed tolerance afforded by the filter loss. Furthermore, a very flat and wide passband is required for all channels.

In the VDV processor, isolation of close to 50 dB is sometimes required between the laser source at 1310 nm and the receiver channels at 1490 and 1550 nm. In a grating-based device the main source of background light arises from scattering from defects on the facet profile. The facets themselves are arranged to create phase coherent interference to disperse and focus light in a wavelength specific manner. Corner rounding between the reflective facet and the non-reflective sidewall will also be periodic, and therefore spatially coherent, but with an inappropriate phase, leading to periodic ghost images with low intensity. Facet roughness will be spatially incoherent, leading to random low-level background light. Thus, if a strong laser signal is incident on a grating and receiver channels are also obtained from that grating, the receiver channels will have a strong background contributed from the laser, at a level typically 30 dB below the strength of the laser. Isolation of ~50 dB is closer to the requirement for a practical VDV processor.

An object of the present invention is to overcome the shortcomings of the prior art by providing a two-stage optical filter planar lightwave circuit bi-directional transceiver with high isolation and low insertion loss.

SUMMARY OF THE INVENTION

Accordingly, the present invention relates to a two stage optical filter planar lightwave circuit device for receiving first and second input channels from a system waveguide and for transmitting an output channel onto the system waveguide comprising:

a laser transmitter for transmitting the output channel;

a non-diffractive filter, having a first passband for multiplexing the output channel onto the system waveguide, and for separating the first and second input channels from the output channel; and a diffraction grating filter for demultiplexing the first and second input channels, each of the first ands second input channels having a second passband narrower than the first passband.

The diffraction grating filter comprising an input port for receiving the first and second input channels; a diffraction grating receiving the first and second input channels at an incident angle; and first and second output ports for outputting the first and second input channels from the diffraction grating filter, respectively.

The two stage optical filter planar lightwave circuit device further comprising first and second output waveguides optically coupled to the first and second ports, respectively for transmitting the first and second input channels, respectively; and first and second photo-detectors optically coupled to the first and second output ports, respectively, for converting the input channels into electrical signals.

BRIEF DESCRIPTION OF THE DRAWINGS

The invention will be described in greater detail with reference to the accompanying drawings which represent preferred embodiments thereof, wherein.

DETAILED DESCRIPTION

One of the major concerns in the design of planar lightwave circuit (PLC) diffraction gratings is the manufacturability of the reflecting and sidewall facets F and S, respectively. Furthermore, a major limit to the manufacturability of the facets heretofore, has been the photolithographic resolution limitations. Typical photolithographic procedures are limited to resolutions in the range of 0.5 to 1.0 μm, so the minimal requirement to achieve reasonable performance from a grating is that the reflecting facet size F must be larger than this resolution, say 2.5 to 5 μm or more in size.

Figure 4:
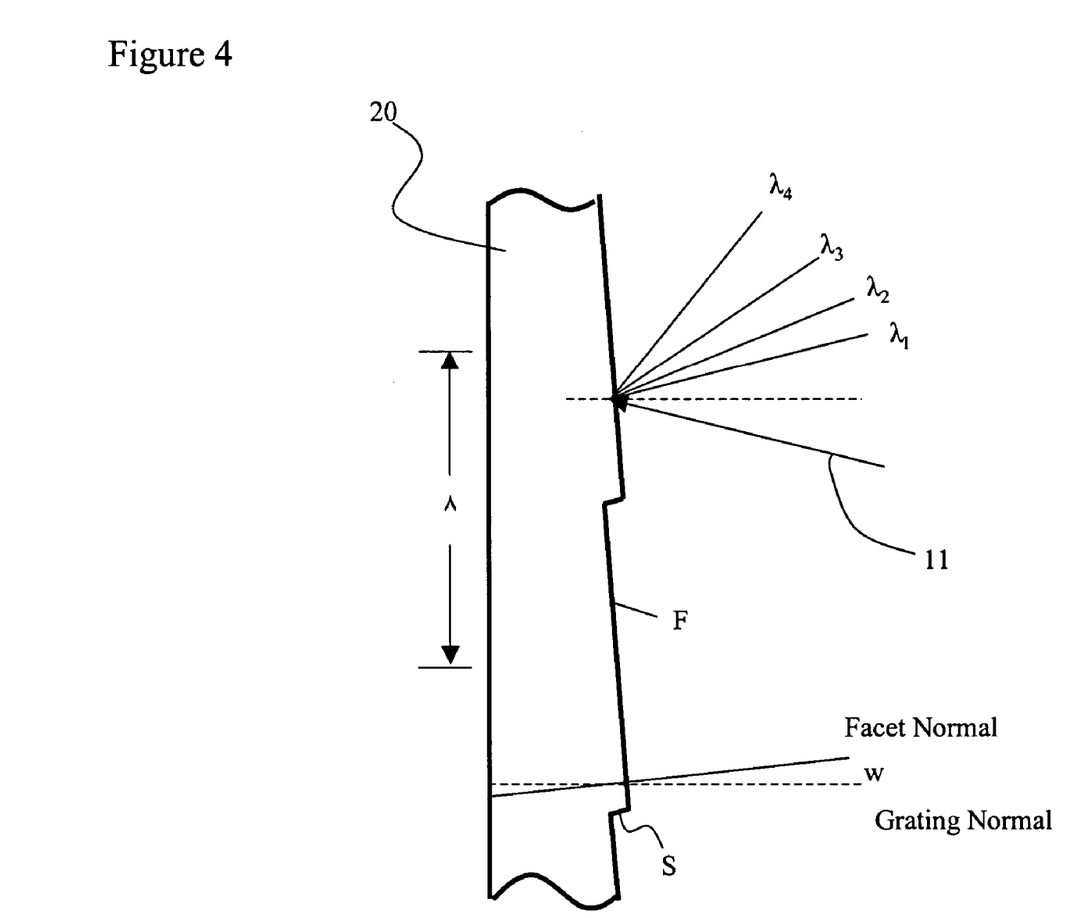
FIG. 4 illustrates a diffraction grating according to the present invention.

In FIG. 4, the light path is simplified by the assumption that the input and output angles $\theta_{in}$ and $\theta_{Nout}$, respectively are identical. This assumption is only to simplify the mathematical treatment of the facet geometry. Accordingly:

$$F \approx \Lambda \cos \theta_{in}; \text{ and} \quad (6)$$

Equation (1) simplifies to $$m\lambda \approx 2\Lambda \sin \theta_{in} \quad (7)$$

Combining equations 6 and 7 yields $$F \approx \frac{m\lambda}{2\tan\theta_{in}} \quad (8)$$

Figure 1:
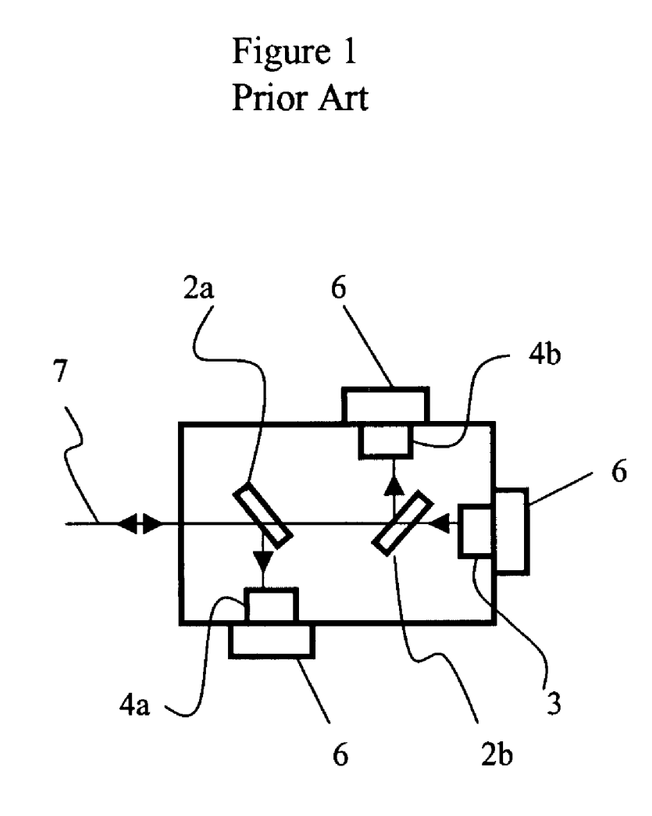
FIG. 1 illustrates a conventional thin film filter based triplexer.

From FIG. 1:

$$\frac{S}{F} \approx \tan\theta_{in} \quad (9)$$

Historically, incidence and output angles of 45° to 65° have been used inevitably leading to grating facet aspect ratio of F/S to be about 1 (see FIG. 3 and Equation 9). At a wavelength of 1550 nm, one finds from equation (6) that facet sizes, for both reflecting F and non-reflecting surfaces S, of 10–17 μm are easily achievable in the prior art, for DWDM applications. This makes grating facets F manufacturable, but at the expense of large non-reflecting facets (or sidewalls) S contributing to the polarization dependent loss. In the prior art, facet size variation is also done by varying the diffraction order m, i.e. adjusting the numerator of equation (8).

Telecommunications networks have evolved from DWDM to CWDM and FTTH networks. The latter two network architectures have channels spanning large wavelength ranges, from ~1250 nm to ~1630 nm. These wide ranges cannot be served by a high-diffraction order device, and often require orders as low as 1. Practitioners of the prior art have not been aware of, or taken advantage of equation (8). At low diffraction orders m and operating angles $\theta_{in}$ and $\theta_{out}$ of 45° to 65° the resulting facet size F for a planar waveguide diffraction grating would be too small to be practically manufacturable. Existing planar waveguide diffraction based devices include AWGs and echelle gratings. Both rely on high diffraction orders; the AWGs need high order operation for guide routing reasons, the echelle technique employs high orders to maintain large facet sizes that are more easily manufactured. Hence, prior art has intrinsic limitations in addressing the CWDM or FTTH network architectures in a planar waveguide platform.

The present invention recognizes the importance of equation (8), in particular the fact that it is possible to increase the grating facet aspect ratio F/S through angular dependence of the denominator. As the diffraction angle is reduced, the facet size increases linearly with $\tan\theta_{in}$. Additionally, inventors recognize that the increase of the facet aspect ratio F/S yields devices with improved polarization dependent loss and larger free spectral range.

For example, in silica-on-silicon, a diffraction order of 5 or less (yielding the smallest practical free spectral range for CWDM or FTTH networks), at a wavelength of 1550 nm, and size of reflecting facet F to exceed 5.0 μm, would require F/S to be increased to more than 3, which can be accomplished by lowering the diffraction angle to about 25°. Thus, the present invention encompasses all planar waveguide diffraction grating designs with the ratio of reflecting to non-reflecting facets (or sidewalls) of at least 3.

The amount of PDL is strongly dependent on the aspect ratio F/S and the length of the non-reflecting facet S. Conventional echelle designs have an aspect ratio of ~1, and are strongly subjected to sidewall dependent PDL; however, for F/S in excess of 3, the non-reflecting facets make substantially smaller contribution to the PDL. By further increasing F/S, it is possible to design manufacturable facets with the non-reflecting grating facet sizes S at or smaller than the wavelength of the reflected light, e.g. S≦3000 nm, preferably ≦2500 nm, even more preferably ≦2000 nm, and ultimately preferably ≦1550 nm. For such gratings, the interaction length of light with the metallized sidewall is so small that PDL-free operation of the device becomes possible.

Therefore, when we enter a regime in which $\tan(\theta)$ is small, i.e. to achieve a ⅓ ratio or θ<25°, we can reduce sidewall dependent PDL.

From a manufacturability standpoint, if reflecting facets F are large, the facets themselves are reproduced faithfully despite photolithographic resolution limits. Small non-reflecting facets S will likely not be reproduced faithfully, and will be slightly rounded, but grating performance is not affected. Practitioners of prior art no doubt have realized that the pitch governs dispersion as per equation (1). However, it is quite common to equate the pitch of a grating to the normal distance between reflecting facets (the sidewall S in FIG. 3). With that thinking, a distortion to the sidewall S could be equated with a distortion to the pitch. This is a mistaken conception, and in fact the pitch is given by equation (6). Counter-intuitively, the pitch increases with F, not S. The present inventors recognize this fact and can increase the aspect ratio, i.e. decrease S/F, shown in equation (9) without risk of affecting the pitch. In fact, the fidelity of the grating reproduction is limited not by photolithography but by the accuracy of the features on the mask itself. This limit is several orders of magnitude (100-fold) smaller than the photolithographic resolution.

Combining equation (8) and (9), we find that:

$$S \approx \frac{m\lambda}{2} \qquad (10)$$

Thus, by choosing a small diffraction order (m=3, 2 or 1, if necessary) one can nearly eliminate PDL, because the sidewall size S becomes less than the wavelength.

Figure 5:
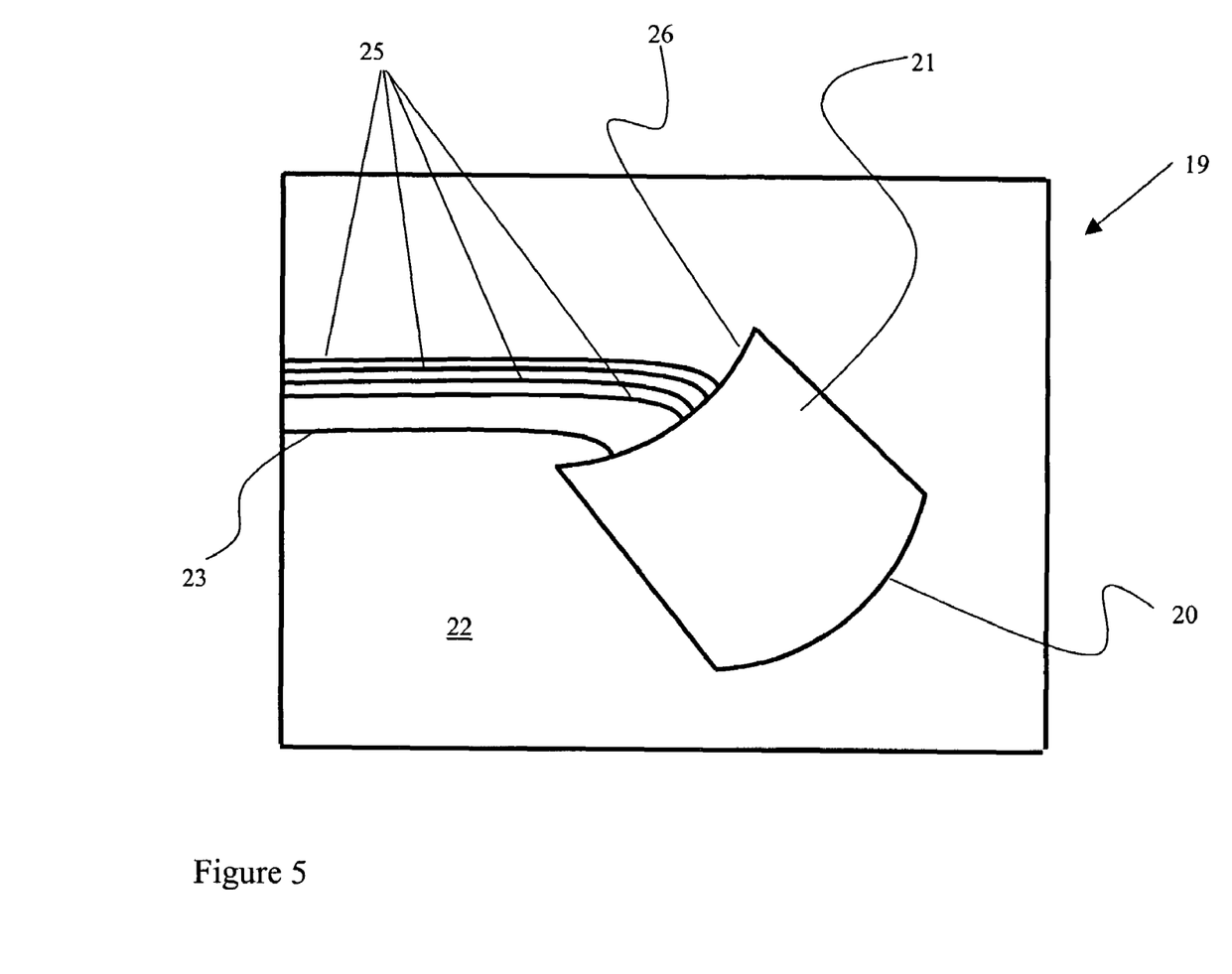
FIG. 5 illustrates a reflective concave diffraction grating PLC filter according to the present invention.

In a preferred embodiment, illustrated in FIGS. 4 and 5, a dispersive PLC optical filter 19 includes a concave reflective diffraction grating 20 is formed at an edge of a slab waveguide 21 provided in chip 22. An input port is defined by an end of a waveguide 23, which extends from an edge of the chip 22 to the slab waveguide 21 for transmitting an input wavelength division multiplexed (WDM) signal, comprising a plurality of wavelength channels ($\lambda_1, \lambda_2, \lambda_3 \ldots$), thereto. The diffraction grating 20, as defined above with reference to FIG. 4, has an aspect ratio (F/S) greater than 5, and a sidewall length S less than or equal to the average wavelength of the wavelength channels ($\lambda_1, \lambda_2, \lambda_3 \ldots$). The input waveguide 23 is positioned to ensure that the incident angle $\theta_{in}$ is less than 45°, preferably less than 30', and more preferably less than 15°, and the grating pitch Λ is selected to ensure that the grating 20 provides diffraction in an order of 5 or less. The diffraction grating 20 disperses the input signal into constituent wavelengths and focuses each wavelength channel on a separate output port in the form of an output waveguide 25, the ends of which are disposed a long a focal line 26 of the grating 20 defined by a Rowland circle, for transmission back to the edge of the chip 22. The illustrated device could also be used to multiplex several wavelength channels, input the waveguides 25, into a single output signal transmitted out to the edge of the chip 22 via the input waveguide 23. The input and output ports represent positions on the slab waveguide 21 at which light can be launched or captured; however, the ports can be optically coupled with other transmitting devices or simply blocked off.

For a biplexer or a triplexer the relevant passbands are 100 nm for the laser, and ~20 nm for the detector channels. Such a device would be impractical to implement with a single diffractive structure because the various channels would share a common physical dispersion. Assume that a spectrometer slab region has been chosen such that the smallest reasonable guiding waveguide widths handle the 20 nm passbands at the grating output. The waveguide width necessary for the 100 nm passband channel would be so wide as to support innumerable modes, creating a device with high sensitivity to fabrication tolerances if a reversible path is necessary for this channel.

Figure 6:
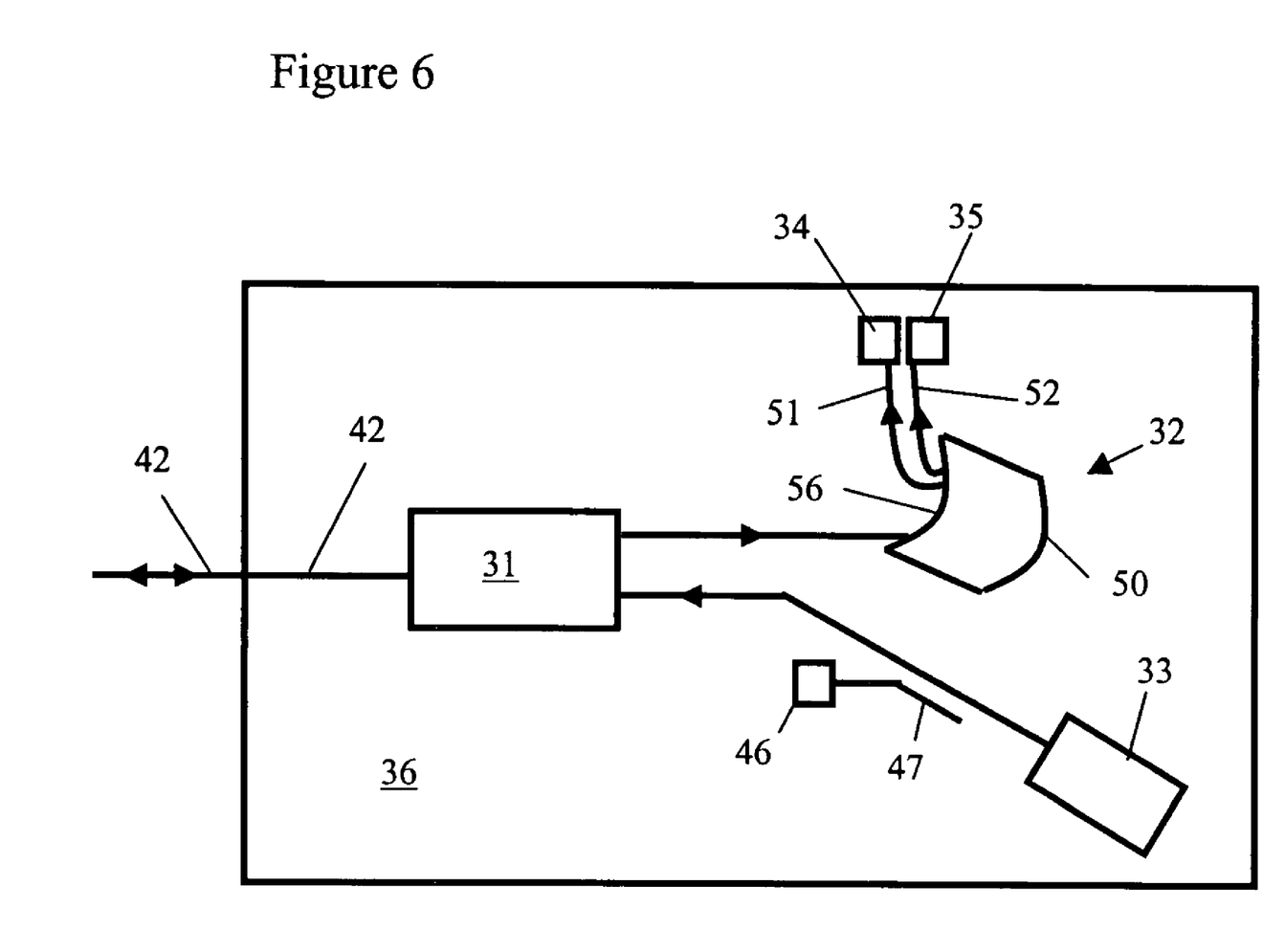
FIG. 6 illustrates a two-stage optical filter according to the present invention.

With reference to FIG. 6, the two-stage optical filter according to the present invention includes a non-dispersive filter 31, a dispersive filter 32, a laser source 33, and first and second photo-detectors 34 and 35 formed in a planar lightwave circuit (PLC) chip 36. A single photo-detector 34 can be provided, when one of the detector channels is omitted. Preferably, the non-dispersive filter 31 is a wavelength selective directional coupler, i.e. two parallel waveguides of specific width, spacing and coupling length, which separates the receiver channels from the laser channel. Alternatively, the non-dispersive filter 31 can be a wavelength dependent modal interference (MMI) filter or a phase dependent wavelength splitter, e.g. a Mach Zehnder interferometer designed for splitting wavelength bands. Instead of a single-stage coupler, a multi-stage coupler or MMI can be used, which provides flatter passbands than those commonly produced by single-stage filters, which slightly improves the insertion loss at the outer edges of the channels, where the passbands from the single-stage filters begin to roll off.

The laser source 33 transmits the data channel along waveguide 41 to the non-dispersive filter 31, which multiplexes the data channel onto output waveguide 42. A system waveguide 43, e.g. an optical fiber, is optically coupled to the output waveguide 43 at the edge of the PLC chip 36. A monitor photodiode 46 can be positioned proximate the back facet of the laser source 33; however, the structure of the present invention enables the monitor photodiode 46 to be positioned upstream of the laser source 33 optically coupled thereto via a tap coupler 47, which separates a small portion (2%) of the laser light. Back facet monitors measure the light produced by the laser, but not what is actually coupled to the waveguide 41, i.e. into the PLC chip 36; however, the downstream photodiode 46 is able to directly measure what light has been coupled in the waveguide 41.

The detector channels must pass through both stages of the filter, i.e. the non-dispersive filter 31 and the dispersive filter 32, and are processed by the grating-based dispersive filter 32. Preferably, the dispersive filter 32 is similar the dispersive filter 19, as disclosed with reference to FIG. 5, including a concave reflective diffraction grating 50 with a focal line 56, preferably defined by a Rowland circle. As above, a launch waveguide 53 extending between the non-dispersive filter 31 and the dispersive filter 32 is positioned to ensure that the incident angle $\theta_{in}$ is less than 45°, preferably less than 30°, and more preferably less than 15°. Furthermore, the diffraction grating 50 has a pitch $\Lambda$ selected to ensure that the diffraction grating 50 provides diffraction in an order of 5 or less.

Figure 7:
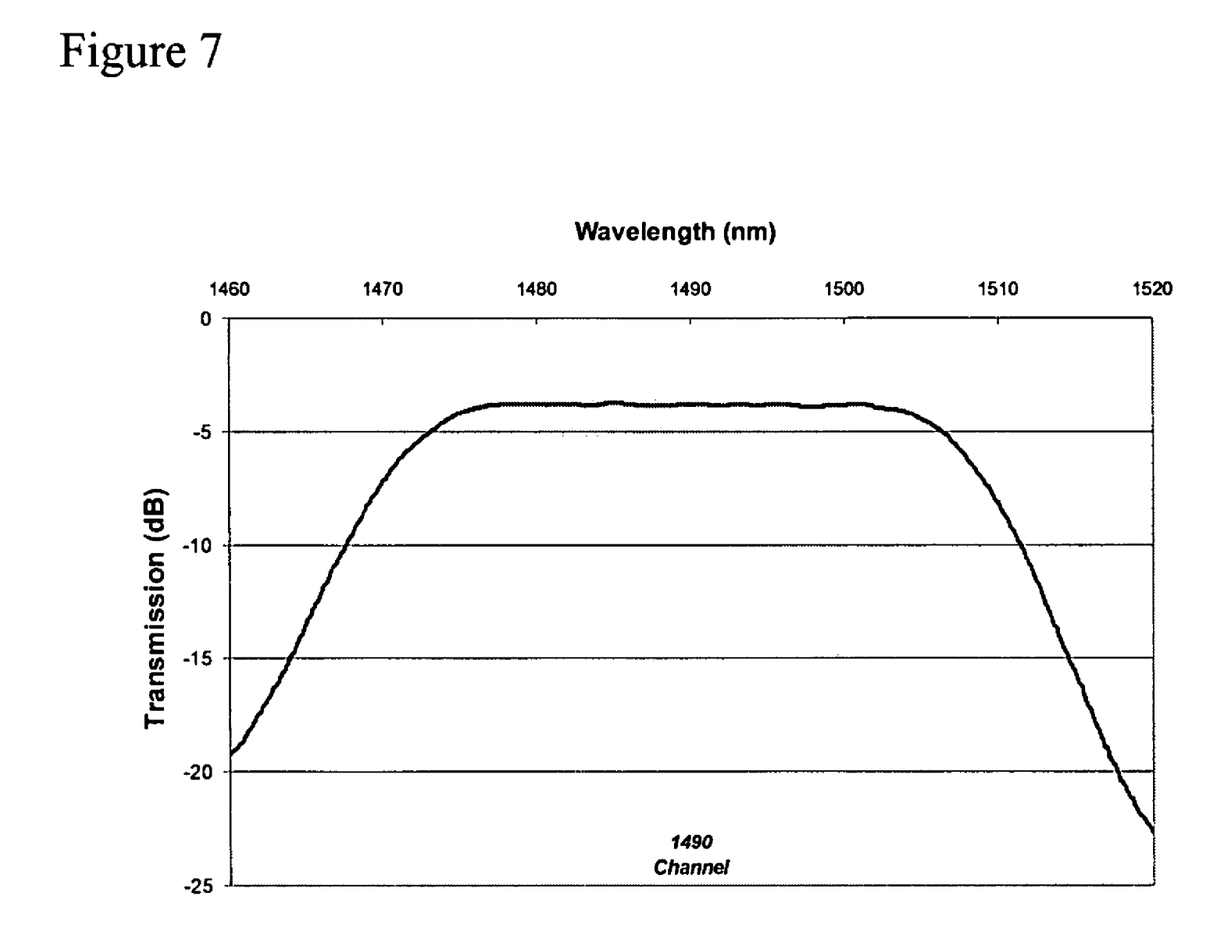
FIG. 7 illustrates an output spectrum from a second stage of the optical filter of FIG. 6.

Typical grating-based demultiplexers exhibit relatively sharp passbands that are difficult to make wide and flat, as required for the bi-directional transceiver application. Accordingly, the present invention incorporates multi-mode output waveguides 51 and 52 at output ports along the focal line 56. The multi-mode waveguides 51 and 52 support an innumerable collection of modes, which serves to flatten the spectral response of the grating output, as shown in FIG. 7. Alternatively, the first and second output waveguides 51 and 52 include a multimode section adjacent to the first and second ports, respectively, and a single mode section remote therefrom for providing the diffraction grating filter 31 with a flattened spectral response. The waveguides 51 and 52 direct the light from the output ports to the first and second photo-detectors 34 and 35, respectively.

Figure 8:
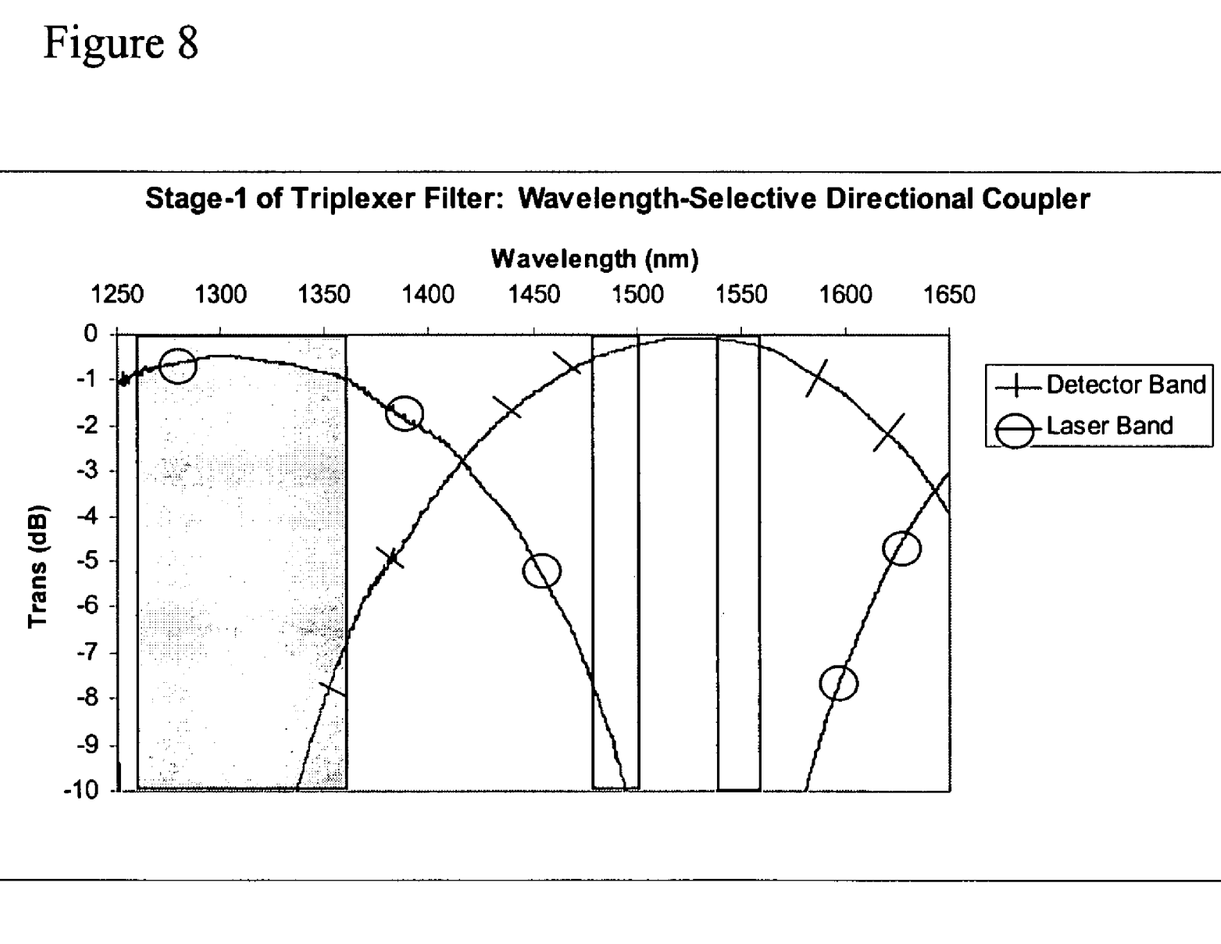
FIG. 8 illustrates an output spectrum from a first stage of the optical filter of FIG. 6.

The present invention achieves the varying passbands for the detector and signal channels by incorporating a dual-stage filter, in which the laser channel is separated from the detector channels, which are further demultiplexed with a dispersive element of higher resolution. The passband of the laser channel is therefore determined by the first stage of the filter, e.g. the wavelength-selective directional coupler 31, while the passband of the detector channels is determined predominantly by the second stage of the filter, e.g. grating-based dispersive element 32. The directional coupler 31 can be designed to easily cover a passband of 100 nm, as shown in FIG. 8. The detector channels undergo further processing by the grating.

As demonstrated in FIGS. 7 and 8, narrow transmission passbands are achieved for detector channels, whereas the laser channel is quite broad. The detector channels at 1490 and 1552 nm encounter both stages of the filter, and they are dispersed into narrow bands by the dispersive filter 32. The output waveguides 51 and 52 used in the dispersive filter 32 enable the passbands to be extremely flat and wide across the whole range of interest. The 1310 nm radiation is extracted following only the first stage of the filter, e.g. the wavelength-selective directional coupler, with extremely low loss. The loss for the laser channel is therefore far superior to other Triplexer filters in which the laser channel must pass through one or several grating-based elements. The present two-stage configuration ensures that there is no direct path from the laser source 33 to the first and second photo-detectors 34 and 35, and the two channels are always counter-propagating, resulting in extremely high isolation of the laser source 33 from the first and second photo-detectors 34 and 35. The level of isolation is significantly improved from the typical level of 30 dB from a standard grating, and can exceed the 50 dB specification required by some customers.

We claim:

1. A two stage optical filter planar lightwave circuit device for receiving first and second input channels from a system waveguide and for transmitting an output channel onto the system waveguide comprising:
   a laser transmitter for transmitting the output channel;
   a non-diffractive filter, having a first passband for multiplexing the output channel onto the system waveguide, and for separating the first and second input channels from the output channel;
   a diffraction grating filter for demultiplexing the first and second input channels, each of the first ands second input channels having a second passband narrower than the first passband, including:
      an input port for receiving the first and second input channels,
      a diffraction grating receiving the first and second input channels at an incident angle, and;
      first and second output ports for outputting the first and second input channels from the diffraction grating filter, respectively;
   first and second output waveguides optically coupled to the first and second ports, respectively for transmitting the first and second input channels, respectively; and
   first and second photo-detectors optically coupled to the first and second output ports, respectively, for converting the input channels into electrical signals.

2. The device according to claim 1, wherein the first and second output waveguides are multimode waveguides for providing the diffraction grating filter with a flattened spectral response.

3. The device according to claim 1, wherein the first and second output waveguides include a multimode section adjacent to the first and second ports, respectively, and a single mode section remote therefrom for providing the diffraction grating filter with a flattened spectral response.

4. The device according to claim 1, wherein the diffraction grating filter is concave defining a focal line; and wherein the first and second output ports and the input port are all positioned along the focal line.

5. The device according to claim 4, wherein the focal line is defined by a Rowland circle.

6. The PLC according to claim 1, wherein the non-diffractive filter comprises a modal interference (MMI) filter.

7. The PLC according to claim 1, wherein the non-diffractive filter comprises a wavelength-dependent directional coupler.

8. The PLC according to claim 1, wherein the non-diffractive filter comprises a multi-stage wavelength-dependent directional coupler.

9. The PLC according to claim 1, wherein the non-diffractive filter comprises a phase dependent wavelength splitter.

10. The PLC according to claim 9, wherein the non-diffractive filter comprises a Mach Zehnder interferometer.

11. The PLC according to claim 9, wherein the non-diffractive filter comprises a multi-stage phase dependent wavelength splitter.

12. The PLC according to claim 1, further comprising:
a tap coupler disposed between the laser transmitter and the non-diffractive filter for tapping a portion of the output channel; and
a monitor photo-detector for measuring the portion of the output channel providing a measure of power in the output channel.

13. The device according to claim 1, wherein the first and second input channels have passbands of approximately 20 nm to 30 nm; and wherein the output channel has a passband of approximately 100 nm.

14. The device according to claim 1, wherein the first and second input channels have passbands of approximately 2 to 5 times more than the output channel passband.

15. The device according to claim 1, wherein the diffraction grating filter is a reflective diffraction grating for dispersing the first and second channels at various angles according to wavelength, the reflective diffraction grating having a plurality of reflective walls defined by a facet length, and a plurality of sidewalls defined by a sidewall length; and wherein an aspect ratio, defined by the facet length divided by the sidewall length, is greater than 3.

16. The device according to claim 1, wherein the diffraction grating filter is a reflective diffraction grating for dispersing the first and second channels at various angles according to wavelength, the reflective diffraction grating having a plurality of reflective walls defined by a facet length, and a plurality of sidewalls defined by a sidewall length; and wherein the sidewall length is less than or equal to an average wavelength of the first and second channels.

17. The device according to claim 1, wherein the input port launches the first and second channels at a diffraction grating incident angle of less than 30°.

18. The device according to claim 1, wherein the diffraction grating filter is a reflective diffraction grating for dispersing the first and second channels at various angles according to wavelength, the reflective diffraction grating having a plurality of reflective walls defined by a facet length, and a plurality of sidewalls defined by a sidewall length; wherein the facet length and the incident angle are selected to ensure that the grating provides diffraction in an order with an absolute value of 7 or less.

19. The device according to claim 18, wherein the input port launches the first and second channels at a diffraction grating incident angle of less than 30°.

* * * * *